(12) United States Patent
Yamada

(10) Patent No.: US 7,693,681 B2
(45) Date of Patent: Apr. 6, 2010

(54) SYSTEM FOR DETERMINING THREE DIMENSIONAL POSITION OF RADIO TRANSMITTER

(75) Inventor: Kentaro Yamada, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 385 days.

(21) Appl. No.: 11/797,224

(22) Filed: May 1, 2007

(65) Prior Publication Data

US 2007/0265799 A1 Nov. 15, 2007

(30) Foreign Application Priority Data

May 1, 2006 (JP) .............................. 2006-127577

(51) Int. Cl.
*G01C 9/00* (2006.01)
(52) U.S. Cl. .................................................... 702/152
(58) Field of Classification Search ................. 702/152; 340/572.1, 539.13
See application file for complete search history.

(56) References Cited

U.S. PATENT DOCUMENTS

2006/0055530 A1* 3/2006 Wang et al. ............ 340/539.13

2006/0273905 A1* 12/2006 Choi et al. ............... 340/572.1

OTHER PUBLICATIONS

Dirk Hahnel, et al., "Mapping and Localization with RFID Technology", Proceedings of the 2004 IEEE, Apr. 2004, pp. 1015-1020.

* cited by examiner

*Primary Examiner*—Tung S Lau
*Assistant Examiner*—Xiuquin Sun
(74) *Attorney, Agent, or Firm*—Squire, Sanders & Dempsey L.L.P.

(57) ABSTRACT

A method for determining a three-dimensional position of an RFID tag includes moving a mobile object carrying an RFID antenna in a workplace to a first position where the RFID antenna receives a radio signal from the RFID tag. A horizontal angle and a vertical angle are determined from the RFID antenna to the RFID tag based on the feasibility of communication between the RFID antenna and the RFID tag as the RFID antenna is turned or moved in a horizontal direction and a vertical direction, respectively, at the first position. A distance from the RFID antenna to the RFID tag is determined based on the power of the signal received from the RFID tag. A three-dimensional position of the RFID tag is determined by vector calculation using the horizontal angle, the vertical angle, and the distance.

5 Claims, 10 Drawing Sheets

(a)

(b)

(c)

SYSTEM FOR DETERMINING THREE DIMENSIONAL POSITION OF RADIO TRANSMITTER

BACKGROUND OF THE INVENTION

1. Field of the Invention

The present invention relates to a scheme for determining a three-dimensional position of a radio transmitter. More specifically, the present invention relates to a scheme for accurately estimating a three-dimensional position of an RFID (Radio Frequency Identification) tag by using RFID tag system.

2. Description of the Related Art

In the RFID tag system, an RFID tag with an unique identification (ID) recorded therein is attached to an object. The object is identified by ID information (tag ID) included in the RFID tag and is received by an RFID antenna.

Some types of RFID tag receives electric power from radio waves received from the RFID antenna. This type of RFID needs not individual power sources. Thus, the device may be downsized by the size of the power source. This type of the RFID tag system may be applied to a small and lightweight object to be detected. That widens the usage of that kind of RFID tag system.

The RFID tag system has a problem of low accuracy in estimating a position, when a tag is placed relatively far away because of the characteristics of the system. A conventional method for estimating a position of the RFID tag is to provide a plurality of RFID antennae in a workspace to roughly detect the presence of the RFID tag near the RFID antenna that receives radio waves from the RFID tag.

In the method for estimating a position of the RFID tag proposed Intel Corporation, a two-dimensional position of the RFID tag is determined using probability scheme such as the Bayes' rule as can be seen in; "Mapping and Localization with RFID Technology", Matthal Philipose et al., Proceedings of the 2004 IEEE International Conference on Robotic and Automation. In the method, an RFID antenna carried by a robot detects an RFID tag at a measurement point in a workspace. Probability (likelihood) of presence of an RFID tag near the measurement point is determined. The process is repeated as the robot moves in the workspace to obtain a distribution of the likelihood values in the workspace. The measurement point with the highest likelihood determined to be the point at which an RFID tag is present.

When roughly detecting a position of an RFID tag from a position coordinate of an RFID antenna that receives radio wave transmitted from the RFID tag as in the conventional method, however, the larger the communication distance is, the bigger is the region where the RFID tag that has transmitted the radio wave may be present. Accordingly, it is difficult to determine the position as a coordinate.

The method of Philipose et. al. performs position estimation on a two-dimensional plane only. If the method is expanded to three-dimensional position estimation, it requires a great number of samples as well as time in position estimation of the RFID tag.

The present invention provides a method for estimating a three-dimensional position of a radio transmitter (RFID tag) more accurately and quicker than the conventional techniques.

SUMMARY OF THE INVENTION

The present invention provides a method for determining a three-dimensional position of a radio transmitter. The method includes steps of moving a mobile object carrying a radio receiver to a position in a workspace where the radio receiver receives a radio signal from the radio transmitter, of determining a receiving state of the radio signal as the mobile object performs a predetermined action when the radio receiver receives the radio signal, and of determining a three-dimensional position of the radio transmitter based on the receiving state.

According to the present invention, a three-dimensional position of an RFID tag can be accurately and quickly estimated.

In an embodiment of the present invention, the step of determining the receiving state of the radio signal further includes a step of detecting the current position of the radio receiver, and a step of detecting a horizontal angle from the radio receiver to the radio transmitter based on the feasibility of communication between said radio transmitter and said radio receiver when said radio receiver is turned or is moved in a horizontal direction. The method further includes a step of detecting a vertical angle from the radio receiver to the radio transmitter determining a vertical angle from said radio receiver to said radio transmitter based on the feasibility of communication between said radio transmitter and said radio receiver when said radio receiver is turned or is moved in a vertical direction. The method further includes a step of storing the current position, the horizontal angle, the vertical angle and the distance as a receiving state of the radio signal.

In an embodiment of the present invention, the step of determining a receiving state includes a step of detecting a horizontal angle from the radio receiver to the radio transmitter by rotating the mobile object in a horizontal direction, a step of detecting a height position of the radio transmitter by moving the radio receiver in a vertical direction, a step of detecting a vertical angle from the radio receiver to the radio transmitter, a step of moving the radio receiver to the height position, a step of detecting the current position of the radio receiver, a step of detecting a distance from the radio receiver to the radio transmitter by adjusting power of the radio receiver, and a step of storing the current position, the horizontal angle, the vertical angle and the distance as a receiving state of the radio signal.

In an embodiment of the present invention, the step of determining a receiving state includes a step of determining a horizontal angle from the radio receiver to the radio transmitter by rotating the radio receiver in a horizontal direction, and a step of detecting a vertical angle from the radio receiver to the radio transmitter by rotating the radio receiver in a vertical direction. The process further includes a step of detecting the current position of the radio receiver, a step of detecting a distance from the radio receiver to the radio transmitter by adjusting power of the radio receiver, and a step of storing the current position, the horizontal angle, the vertical angle and the distance as a receiving state of the radio signal.

In an embodiment of the present invention, the step of storing a receiving state includes a step of detecting a horizontal angle from the radio receiver to the radio transmitter by moving the radio receiver in a horizontal direction, a step of detecting a height position of the radio transmitter by moving the radio receiver in a vertical direction, a step of detecting a vertical angle from the radio receiver to the radio transmitter, a step of moving the radio receiver to the height position, a step of detecting the current position of the radio receiver, a step of detecting a distance from the radio receiver to the radio transmitter by adjusting power of the radio receiver, and a step of storing the current position, the horizontal angle, the vertical angle and the distance as a receiving state of the radio signal.

Another embodiment of the present invention includes a step of moving the mobile object in a workspace to a second position that is different from the position for receiving the radio signal and a step of determining a second receiving state of the radio signal as the mobile object takes a predetermined action at the second position. The step of determining the three-dimensional position of the radio transmitter determines the three-dimensional position of the radio transmitter based on the receiving state and the second receiving state.

In an embodiment of the present invention, the radio transmitter is an RFID tag and the radio receiver is an RFID antenna. In another embodiment of the present invention, the mobile object is an autonomous legged robot or an autonomous wheeled robot.

The present invention provides a program for estimating a three-dimensional position of a radio transmitter. The program causes a computer to execute a function of moving a mobile object provided with a radio receiver in a workspace to a position where the radio receiver receives a radio signal from the radio transmitter, a function of storing a receiving state of the radio signal by causing the mobile object to perform a predetermined operation when the radio receiver receives the radio signal, and a function of determining a three-dimensional position of the radio transmitter based on the receiving state.

The present invention provides a system for estimating a three-dimensional position of a radio transmitter provided in a workspace. The system includes a mobile object that moves in the workspace carrying a radio transmitter. A radio receiver for receiving a radio signal from the radio transmitter is provided in the workplace. The system includes a controller for moving the mobile object in the workspace to a position where the radio receiver receives the radio signal. The system further includes means for causing the mobile object perform a predetermined operation when the radio receiver receives the radio signal and storing a receiving sate of the radio signal and computation means for determining a three-dimensional position of the radio transmitter based on the receiving state of the radio signal.

DETAILED DESCRIPTION OF THE PREFERRED EMBODIMENTS

Figure 1:
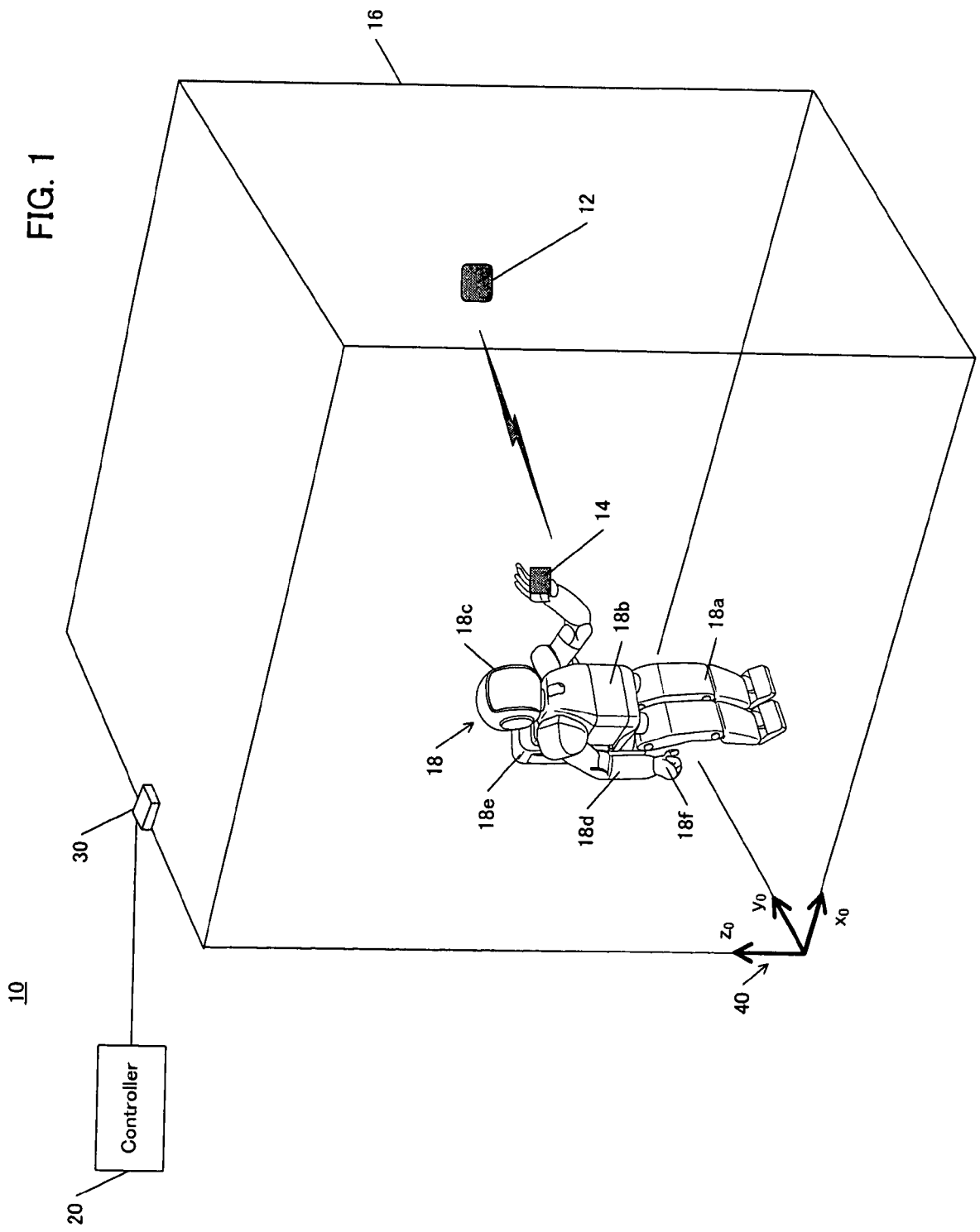
FIG. 1 is a schematic diagram showing a configuration of a system for estimating a three-dimensional position of an RFID tag according to an embodiment of the present invention.

Preferred embodiments of the present invention will be described with reference to the drawings. First, referring to FIGS. 1 and 2, a system for estimating a three-dimensional position of an RFID tag according to an embodiment of the present invention will be described. FIG. 1 is a schematic diagram showing a configuration of a system 10 for estimating a three-dimensional position of an RFID tag according to an embodiment of the present invention.

The system 10 includes an RFID tag system which comprises an RFID tag 12 and an RFID antenna 14 and a robot 18 carrying the RFID antenna 14. Robot 18 autonomously moves in a workspace 16. The system 10 includes a controller 20 for providing operational instructions to the robot 18 and transmitting instructions to the RFID antenna 14. Controller 20 estimates a three-dimensional position of the RFID tag 12 based on the measurement result by the RFID antenna 14.

In the RFID tag system, the RFID tag 12 includes a memory storing an unique Identification (tag ID). RFID tag 12 is attached to an object. The system recognizes the object by the tag ID of the RFID tag, which is transmitted by RFID tag 12 and is received by RFID antenna 14. The tag ID provides information on the object such as type, shape and weight of the object.

In the embodiment, RFID tag 12 is attached to an object in the workspace 16. The RFID antenna 14 is carried on a palm of a hand 18f of the robot 18 and moves in the workspace 16 as the robot 18 moves.

The robot 18 in the embodiment is a two-legged robot that can autonomously move. The robot 18 can move in the workspace 16 and performs various tasks based on operational instructions sent from the controller 20 via a base station 30.

The robot 18 has two legs 18a, with a torso 18b thereon. A head 18c is placed on the torso 18b, and two arms 18d extend from the sides of the torso 18b. A trunk 18e is provided on the back of the torso 18b and contains a control unit 39 for controlling operations of the robot body and a battery.

Six junctions are provided for each of right and left legs 18a of the robot 18. The junctions are driven by actuators such as electric motors. The robot 18 can give desired movements to the legs and walk in a three-dimensional space by driving joints of the legs 18e in an appropriate angle. The detail of walking of the two-legged robot is discussed in Japanese Patent Application Publication No. 2005-219206, for example.

Each of the right and left arms 18d of the robot 18 is provided with seven joints, each of which is driven by one or more actuators such as an electric motor. To each end of the right and left arms 18d, a five-fingered hand 18f is provided. The robot 18 can move each of the joints of the arms 18d and the hands 18f to perform a desired task by driving it in an appropriate angle. In the embodiment, on a palm of the hand 18f of the robot 18, the RFID antenna 14 is provided. Robot 18 adjusts the position and direction of the antenna 14 by controlling angle of each of the joints of the arm 14d.

A camera (not shown) is provided in the workspace 16 or in the robot 18. The robot 18 has a gyro sensor. Position such as the coordinate of the current position or the direction of the body or the head of the robot 18 can be recognized from images captured by the camera and outputs produced by the gyro sensor. The robot 18 may be adapted to accurately recognize the position of itself by using a position detecting technique such as the ultrasonic tag system or the infrared tag system.

The controller 20 gives transmission instruction to the RFID antenna 14 via the base station 30 to obtain a tag ID of RFID tag 12. The controller 20 also gives the operational instruction to the robot 18 to move to the place where the RFID antenna 14 can receive radio waves transmitted by RFID tag 12 in the workspace.

Figure 4:
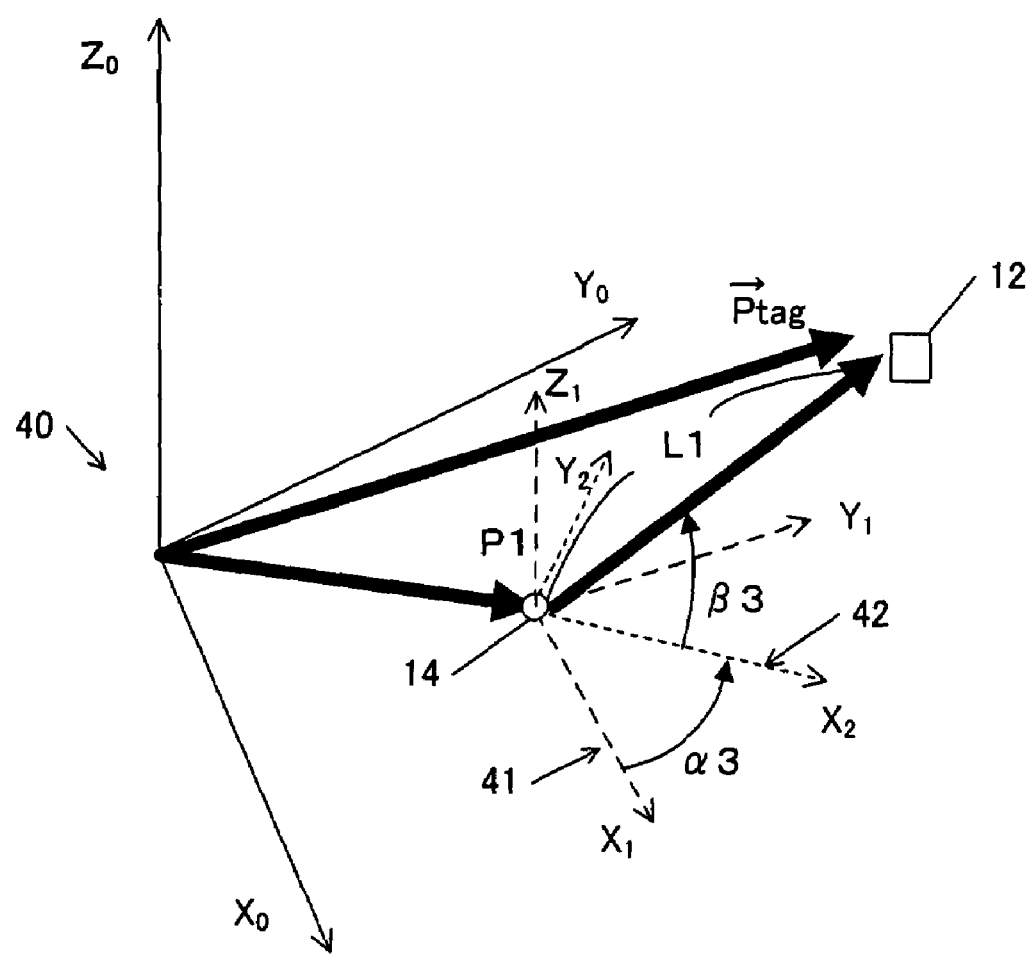
FIG. 4 is a diagram showing a position Ptag of an RFID tag 12 in a three-dimensional coordinate axis set in a workspace.

When RFID antenna 14 receives a radio signal, the controller 20 adjusts direction and position of RFID antenna 14 by moving arms and legs of the robot 18 to determine the direction from RFID antenna 14 to RFID tag 12. Referring to FIG. 4, based on positional information on robot 18 and outputs from various sensors, the controller 20 determines the three-dimensional position coordinate p of RFID antenna 14. The controller 20 also determines horizontal angle α3, vertical angle β3 and distance L1 from RFID antenna 14 to RFID tag 12. Based on these values, the controller 20 calculates three-dimensional position $P_{tag}$ of RFID tag 12 in the three-dimensional coordinate 40 in the workspace 16.

Figure 2:
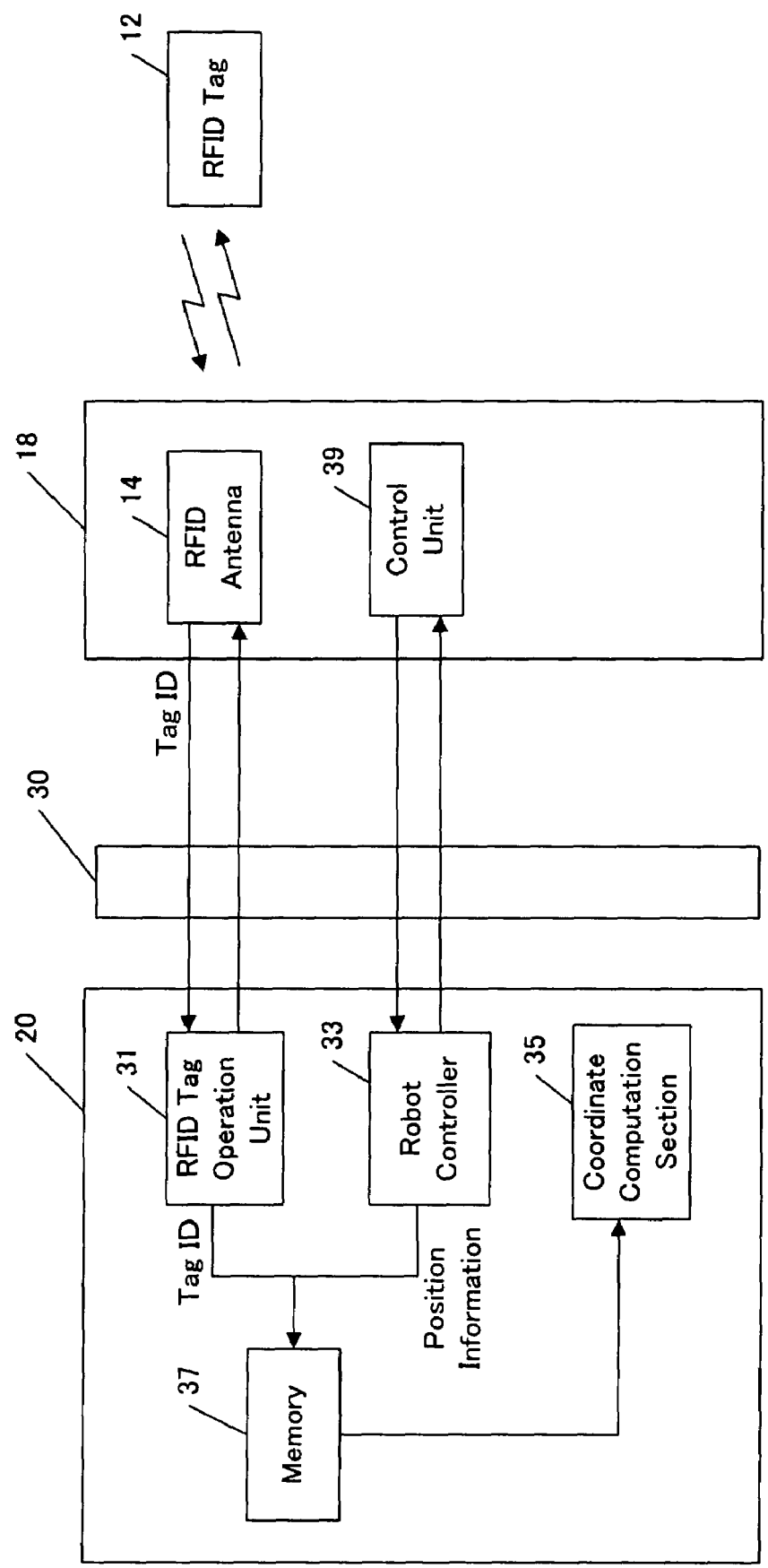
FIG. 2 is a functional block diagram of a system for estimating a three-dimensional position of the RFID tag.

FIG. 2 is a functional block diagram of the system 10 for estimating a three-dimensional position of the RFID tag according to the embodiment.

The controller 20 has an RFID tag operation unit 31, a robot controller 33, a coordinate computation section 35, and a memory 37. The RFID tag operation unit 31, the robot controller 33, the coordinate computation section 35 and the memory 37 may be integrated together or separated.

The RFID tag operation unit 31 sends an instruction to transmit a radio wave to the RFID tag system and receives a detected tag ID of RFID tag 12. The frequency band to be used for the RFID tag system can be 13.56 MHz, 950 MHz, or 2.45 GHz or the like.

The RFID tag operation unit 31 sends the instruction to transmit a radio wave to the RFID antenna 14 via the base station 30. When RFID antenna 14 receives the instruction, it irradiates a radio wave to RFID tag 12. RFID tag 12 receives electricity from the radio wave received from the RFID antenna 14 and returns a radio signal carrying the tag ID to RFID antenna 14.

RFID antenna 14 detects the tag ID from the radio signal received from the RFID tag and sends it to RFID tag operation unit 31 via the base station 30. If RFID antenna 14 cannot detect the radio wave from RFID tag 12, it sends a NAN (Not A Number) as a tag ID to RFID tag operation unit 31. RFID tag operation unit 31 sends the obtained tag ID and the like to a memory 37.

The robot controller 33 sends the operational instruction to the control unit 39 of the robot 18. When the control unit 39 of the robot 18 receives the operational instruction, it controls the legs 18a of the robot 18 to move along a predetermined path in the workspace 16 and controls the arms 18d or the like to change the direction and position of RFID antenna 14. In the embodiment, the robot 18 may be instructed to move randomly in the workspace, to turn and raise or lower the RFID antenna.

During operation of the robot 18, the control unit 39 obtains sensor information from the various sensors provided in the robot 18 such as a camera or an encoder and sends the information to the robot controller 33.

The robot controller 33 determines the current position, direction, joint angle and other factors of the robot 18 from the sensor information received from the control unit 39. Based on this information, the robot controller 33 calculates the position p and the posture of hand 18f such as horizontal angle α and vertical angle β using such a method as a forward kinematics calculation. As RFID antenna 14 is provided on the palm of the hand 18f with a fixed relative position this embodiment, the position of RFID antenna 14 (the position coordinate p, the horizontal angle α, the vertical angle β) is calculated based on the information including the position and the posture of the hand 18f. The calculated position of RFID antenna 14 is recorded in the memory 37.

The tag ID, the time detected at the RFID tag operation unit 31 and the position of RFID antenna 14 calculated at the robot controller 33 are stored in memory 37 as a set of data associated with each other. The data stored in memory 37 are used by coordinate computation section 35.

The coordinate computation section 35 calculates the three-dimensional position of the RFID tag 12 using the tag ID and the position stored in the memory 37.

The RFID tag operation unit 31, the robot controller 33 and the coordinate computation section 35 are realized by a computer with a processor (CPU, Central Process Unit) performing various computations according to the programs stored in the memory 37.

Now, referring to FIGS. 3 to 10, a method for the controller 20 according to the embodiment to estimate the three-dimensional position of the RFID tag 12 will be described.

Figure 3:
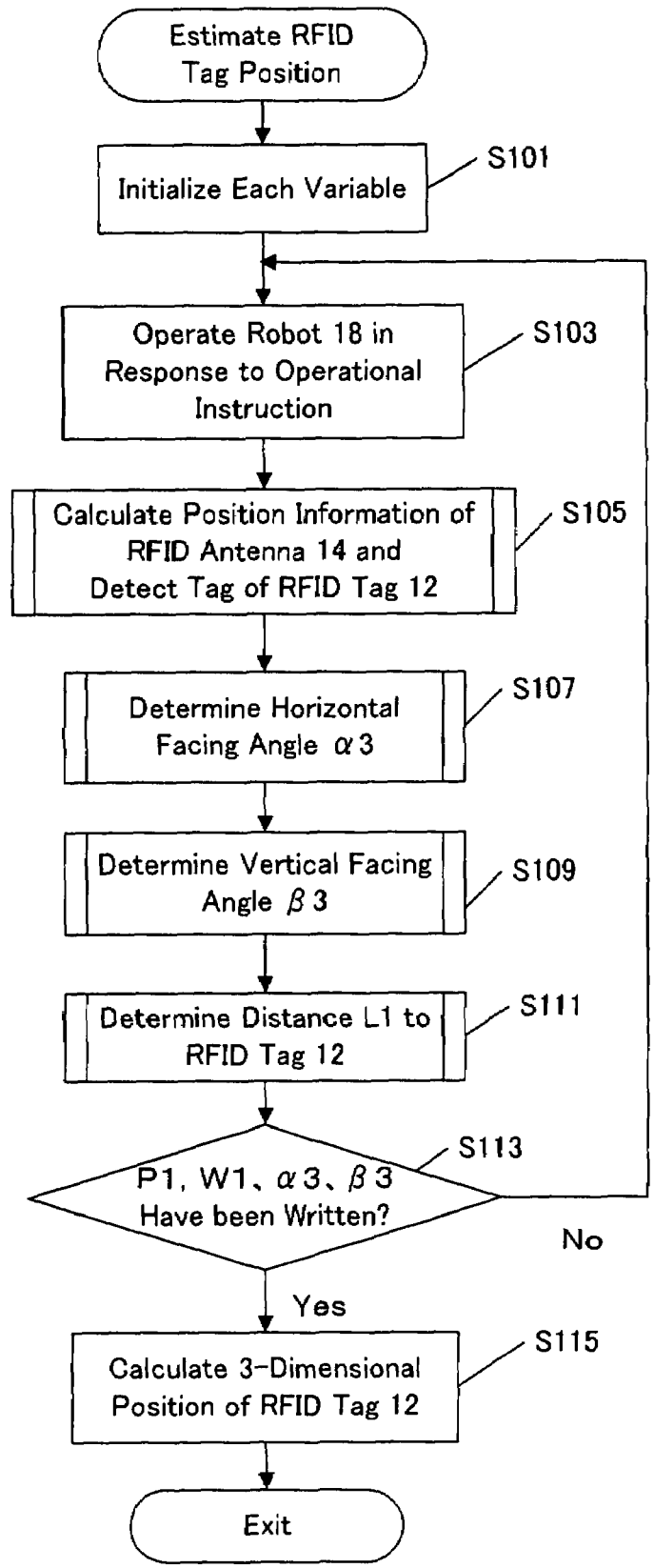
FIG. 3 is a flowchart of process for estimating a three-dimensional position of the RFID tag.

FIG. 3 is a flowchart of the process for estimating a three-dimensional position of the RFID tag 12.

When the system is activated, various variables are initialized (S101). Specifically, a three-dimensional position coordinate P1, a horizontal angle α3, a vertical angle β3 of the REID antenna 14 and a distance L1 to the RFID tag 12 are set to NAN, and an output power w of the REID antenna is set to maximum.

At step S103, robot 18 is moved according to the operational instruction given by the robot controller 33. The operational instruction is "stop" when the process starts, and other instructions are selected at process steps S105 to S111.

At step S105, the robot controller 33 calculates the position (three-dimensional position coordinate p, horizontal angle α, vertical angle β) of RFID antenna 14. The RFID tag operation unit 31 starts detection of the tag ID of RFID tag 12. Process from step S107 to step S111 is performed only after RFID antenna 14 receives a radio wave from the RFID tag 12. Until such reception is made, steps S107 through S111 is passed and robot 18 is moved along a path or randomly in the workspace until such reception is successfully made. This tag detection process will be described later with reference to FIG. 5.

Step S107 is a subroutine for determining a horizontal facing angle α3 required for RFID antenna 14 to turn in a horizontal direction to face RFID tag 12. When RFID antenna 14 has received radio wave from RFID tag 12, the current coordinate p of RFID antenna 14 is recorded in the memory 37 as a position coordinate P1 (S105). The horizontal facing angle α3 is calculated so that robot 18 may be made to turn to this position using legs 18a. Here, α3 is a turn angle around Z1 axis of a new three-dimensional coordinate (the coordinate denoted by the reference numeral 41 in FIG. 4), which is the three-dimensional coordinate 40 moved to P1. The details of the process performed at this step will be described with reference to FIGS. 6 and 7.

Step S109 is a subroutine for determining a vertical facing angle β3 required for RFID antenna 14 to turn in a vertical direction to face the RFID tag 12. At the end of subroutine S107, the robot 18 has turned RFID antenna 14 by an angle α3 in the horizontal direction. In step S109, the vertical facing angle β3 is calculated so that robot 18 may drive joints of the arm 18d to change the direction of RFID antenna 14 in the vertical direction. Here, β3 is a turn angle around a Y2 axis of a new three-dimensional coordinate (the coordinate denoted by the reference numeral 42 in FIG. 4), which is the three-dimensional coordinate 41 turned by the angle α3 around the Z1 axis. Then, the robot 18 moves the RFID antenna 14 by the vertical facing angle β3. The details of the process performed at the step will be described with reference to FIGS. 8 and 9.

Step S111 is a subroutine for determining a distance L1 from RFID antenna 14 to RFID tag 12. At step S109, with RFID antenna 14 facing in the vertical angle β3, robot 18 reduces the output power w of RFID antenna 14 from the maximum value to a lower values stepwise. The output power w immediately before the radio wave from RFID antenna 14 fails to reach RFID tag 12 is converted to distance L1. That is, the output power w is mapped to the distance L1 based on a predetermined relation between the output power and the distance. The details of this process will be described with reference to FIG. 10.

At step S113, whether the various variables have been detected at the abovementioned steps or not is checked. If the position coordinate P1 of the robot 18 has been detected at step S105, the horizontal facing angle α3 and the vertical facing angle β3 have been determined in subroutines S107 and S109, respectively. The distance L1 between the REID antenna 14 and the RFID tag 12 has been determined in subroutine S111. The process proceeds to step S115. Otherwise, the process returns to step S103 and the abovementioned steps are repeated.

At step S115, the coordinate computation section 35 calculates the three-dimensional coordinate Ptag of the RFID tag 12. FIG. 4 illustrates the position P1 of the RFID antenna 14, the horizontal facing angle α3, the vertical facing angle β3, the distance L1 between the RFID antenna 14 and the RFID tag 12, and the position Ptag of the RFID tag 12 in the three-dimensional coordinate 40 of the workplace 16. The position coordinate Ptag of the RFID tag 12 can be represented as a vector Ptag, which is formed by parallel translation of a vector (L1, 0, 0) having a magnitude L1 on X0 axis of three dimensional coordinate 40 to point P1, and by turning by the angle α3 around Z1 axis in a new three-dimensional coordinate 41 with the origin of P1, followed by turning by the angle β3 around Y2 axis in a new coordinate 42 generated by turning the coordinate 41.

Here, the position vector Ptag of RFID tag 12 is expressed by (Ptx, Pty, Ptz) and the position vector P1 of the RFID antenna 14 is expressed by (P1x, P1y, P1z), the position coordinate Ptag of the REID tag 12 can be expressed in a matrix form as follows.

$$\begin{bmatrix} Ptx \\ Pty \\ Ptz \end{bmatrix} = \begin{bmatrix} P1x + L1 \cdot \cos\alpha3 \cdot \cos\beta3 \\ P1y + L1 \cdot \sin\alpha3 \cdot \cos\beta3 \\ P1z + L1 \cdot \sin\beta3 \end{bmatrix} \quad (1)$$

The three-dimensional coordinate of the RFID tag 12 is determined in terms of the variables P1, α3, β3 and L1 determined in steps S107 to S111.

Figure 5:
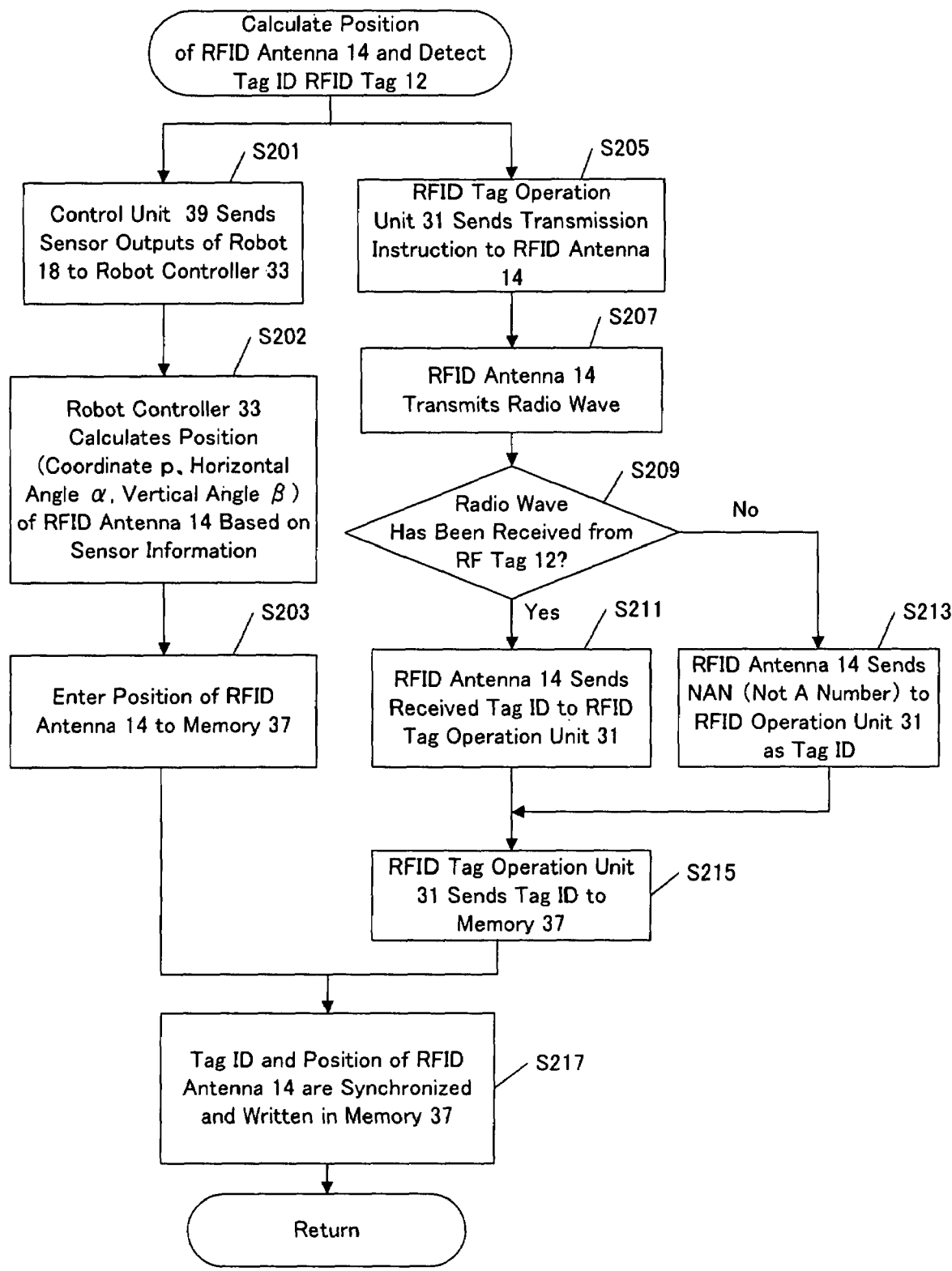
FIG. 5 is a flowchart of subroutine process for measuring position of an RFID antenna and a tag ID of an RFID tag.

Now, the subroutine at step S105 will be described with reference to FIG. 5. FIG. 5 is a flowchart for calculating a position of the RFID antenna 14 and detecting the tag ID of RFID tag 12.

At steps S201 to S203, the position and direction of the RFID antenna 14 (three-dimensional position p, horizontal angle α, vertical angle β) is calculated.

First at step S201, the control unit 39 of the robot 18 obtains sensor outputs from various sensors provided to the robot 18 and sends the output data to the robot controller 33.

At step S202, the robot controller 33 determines the position (position coordinate p, horizontal angle α, vertical angle β) of the RFID antenna 14 based on the sensor outputs. Specifically, first, the current position, the direction and joint angles of the robot 18 are determined from the sensor output received from the control unit 39. Then, based on the sensor data, the position p or posture (horizontal angle α, vertical angle β) of the hand 18f is calculated using a method such as the forward kinematics calculation. RFID antennas 14 is provided on the palm of the hand 18f with a fixed relative position in this embodiment. Thus, the position and posture of the hands 18f can be as the position (the position coordinate p, the horizontal angle α, the vertical angle β) of the RFID antenna 14.

At step S203, the calculated position of the RFID antenna 14 is entered into memory 37.

At steps S205 to S215, detecting process of the tag ID is performed by the RFID tag system. The process is performed in parallel with the process of calculating the position of the RFID antenna 14 performed at steps S201 to S203.

At step S205, the RFID tag operation unit 31 sends the transmission instruction to the RFID antenna 14. At step S207, the RFID antenna 14 transmits a radio wave in response to the transmission instruction.

At step S209, whether the RFID antenna 14 has received the radio signal returned from the RFID tag 12 or not is checked. If the radio signal has been received, it is determined that the RFID tag 12 is within a communication range of the RFID antenna 14 and the operation proceeds to step S211 and the tag ID detected from the received radio signal is sent to the RFID tag operation unit 31. If the radio signal has not been received, it is determined that the RFID tag 12 is out of the communication range of the RFID antenna 14 and the operation proceeds to step S213 and the RFID antenna 14 sends data of NAN (Not A Number) to the RFID tag operation unit 31 as the tag ID.

At step S215, the RFID tag operation unit 31 sends ID information of the RFID tag 12 to the memory 37.

Then at step S217, the position of the RFID antenna 14 and the position of the tag ID information of the RFID tag 12 are synchronized and stored in the memory 37.

Figure 6:
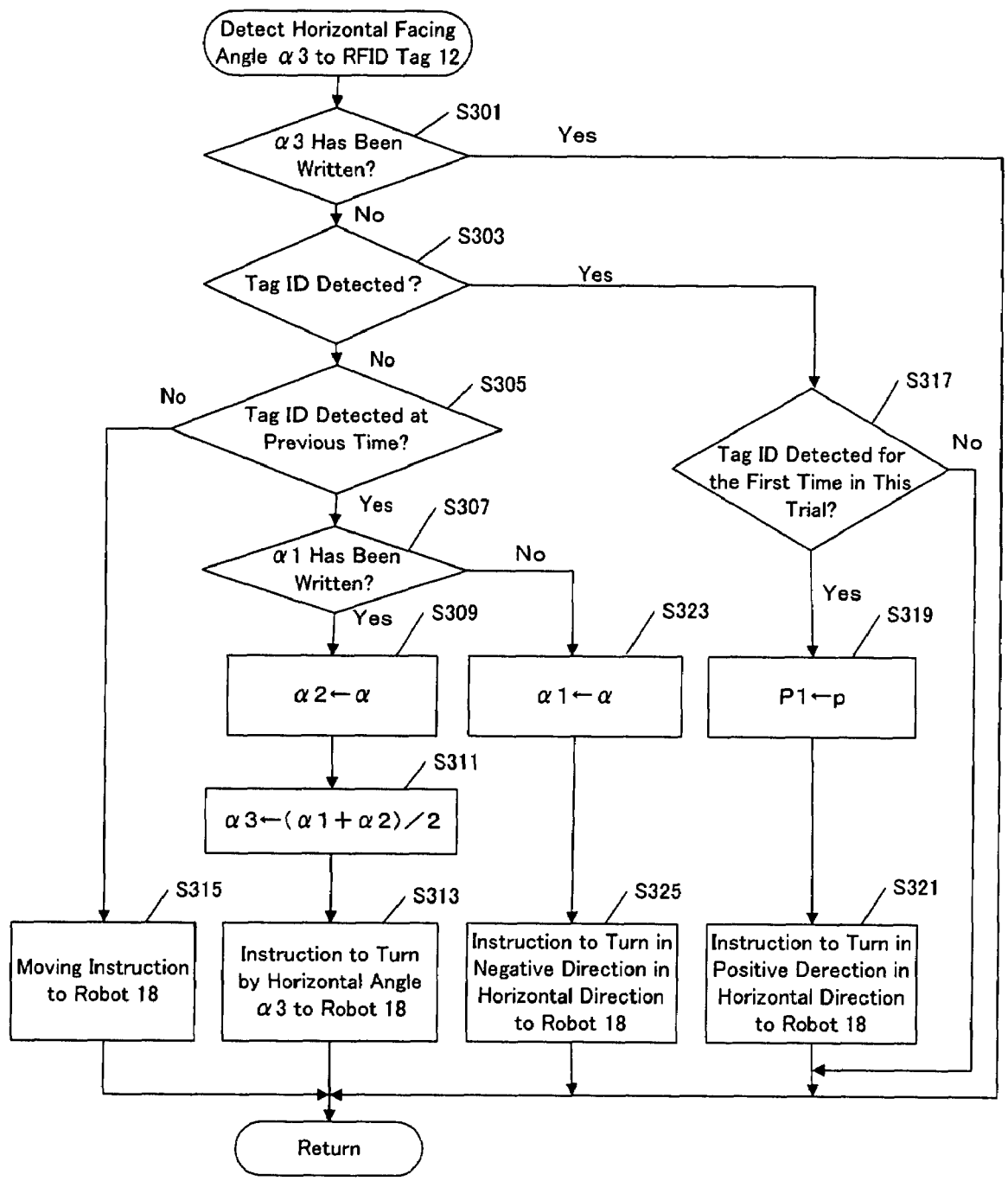
FIG. 6 is a flowchart of subroutine process for detecting a horizontal angle $\alpha 3$ from the RFID antenna to the RFID tag.
Figure 7:
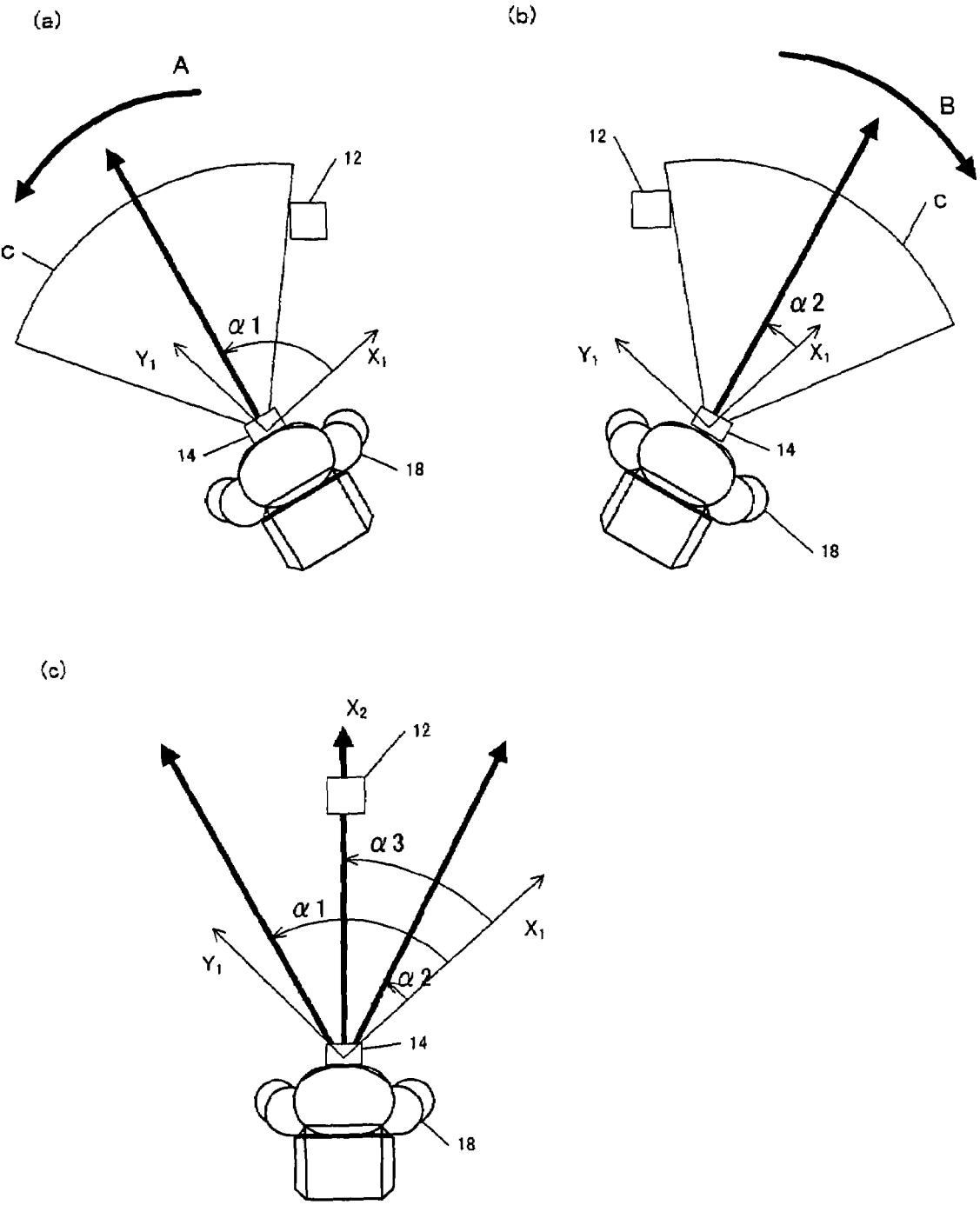
FIG. 7 is a diagram showing relationship among horizontal angles $\alpha 1$, $\alpha 2$, $\alpha 3$ and operations of a robot.

Referring to FIGS. 6 and 7, the subroutine process at step S107 will be described. FIG. 6 is a flowchart of the process for determining the horizontal facing angle α3.

If the horizontal facing angle α3 is not written before the RFID antenna 14 receives the tag ID of the RFID tag 12 (S301), and if the tag ID has not been detected (S303), and if the tag ID has not been detected previously (S305), the process proceeds to step S315. Robot 18 is made to move randomly or along a predetermined route in the workspace 16.

If RFID antenna 14 detects the tag ID of RFID tag 12 when the robot 18 moves (S303), the process proceeds to step S317. If the tag ID was detected for the first time in this trial, that is, transmission and reception trial at the same position of RFID antenna 14, the position coordinate p of the current RFID antenna 14 is written into the memory 37 as the position vector P1 (S319) and an instruction to turn in a positive direction in the horizontal direction is given to the robot 18 (S321).

The instruction to turn in the positive direction given to the robot 18 is maintained while the RFID antenna 14 detects the tag ID of RFID tag 12 by repeating the steps of S303, S317, and Return. During this process, robot 18 turns to the direction shown by arrow A in FIG. 7(a), for example.

When the RFID antenna 14 no longer detects the tag ID of the RFID tag 12 again (S303), whether or not a boundary value α1 of the horizontal angle α where the tag ID can be detected has been written in the memory 37 is checked (S307). If α1 has not been written in the memory 37 at this stage, the current horizontal angle α is written in the memory 37 as the boundary value α1 (S323). Here, an instruction to stop turning is given to the robot 18. FIG. 7(a) illustrates a detecting area C of RFID antenna 14 carried by the robot 18 and its relation with the RFID tag 12. The direction the robot 18 faces in FIG. 7(a) is the horizontal angle α1. Then, an instruction to turn in the negative direction, the opposite direction, is given to the robot 18 from the state of FIG. 7(a) (S325). For convenience of the description, the direction of the robot 18 is the direction of the antenna 14 in FIGS. 7(a), (b) and (c).

The instruction to turn to the negative direction of the robot 18 is maintained while the RFID antenna 14 detects the tag ID of the RFID tag 12 by repeating the steps of S303, S317 and Return. During this process, robot 18 turns to the direction shown by an arrow B in FIG. 7(b), for example.

In contrast to the embodiment, the instruction to turn given to the robot 18 at step S321 and step S325 may be opposite, that is, negative direction may be given at step S321 and positive direction may be given at step S325.

When the RFID antenna 14 no longer detects the tag ID of the RFID tag 12 again (S303), whether or not a boundary α1 of the horizontal angle α1 where the tag ID can be detected has been written in the memory 37 is checked (S307). If α1 has been written in the memory 37 at this stage, the current horizontal angle α is written in the memory 37 as another boundary value α2 (S309). An instruction to stop is given to the robot 18. FIG. 7(b) illustrates the detecting area C of RFID antenna 14 carried by the robot 18 and its positional relation with RFID tag 12. In FIG. 7(b), the direction the robot 18 faces is the horizontal angle α2.

Then, the center value α3 of α1 and α2 is calculated by using the α1 and α2 read from the memory 37 (S311).

$$\alpha 3 = (\alpha 2 + \alpha 1)/2 \quad (2)$$

The center value α3 is written into the memory 37 as the horizontal facing angle α3 to RFID tag 12 (S311). An instruction to turn by the horizontal facing angle α3 is given to the robot 18 so that the robot 18 moves to the angle α3 from the X1 axis (S313). FIG. 7(c) illustrates horizontal facing angle α3, and horizontal angles α1 and α2 and their positional relation with RFID tag 12.

After the horizontal angle α3 is written in the memory 37, the subroutine directly returns to the main flow as the decision at step S301 is "Yes".

Figure 8:
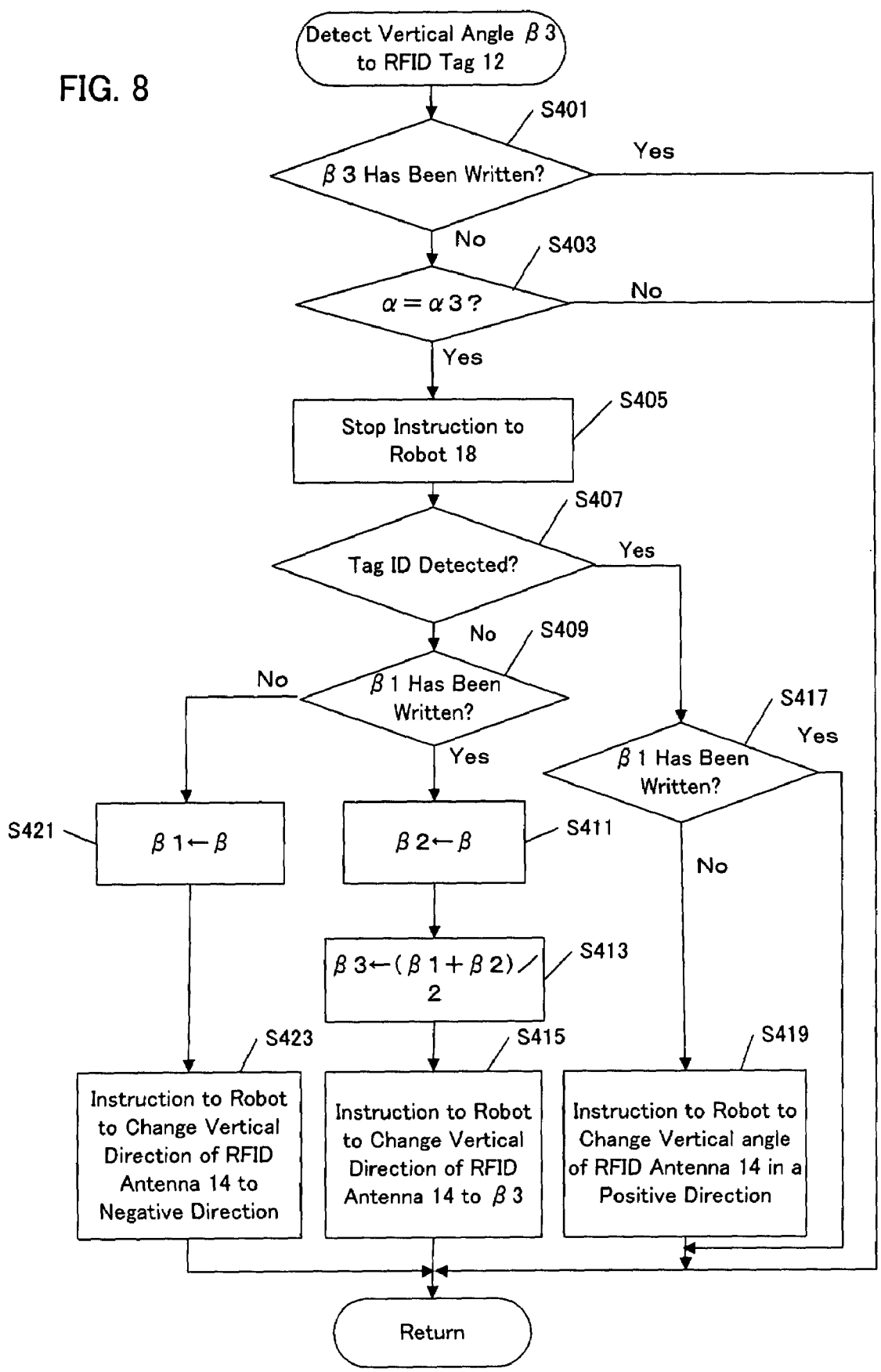
FIG. 8 is a flowchart of subroutine process for detecting a vertical angle $\beta 3$ from the RFID antenna to the RFID tag.
Figure 9:
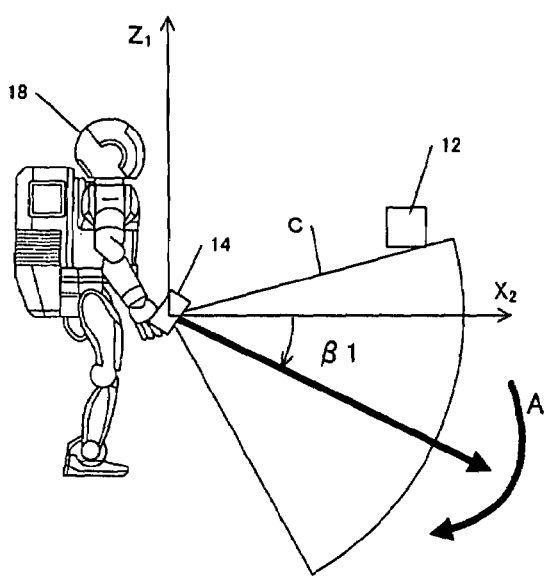
FIG. 9 is a diagram showing relationship among vertical angles $\beta 1$, $\beta 2$, $\beta 3$ and operations of a robot.
Figure 9:
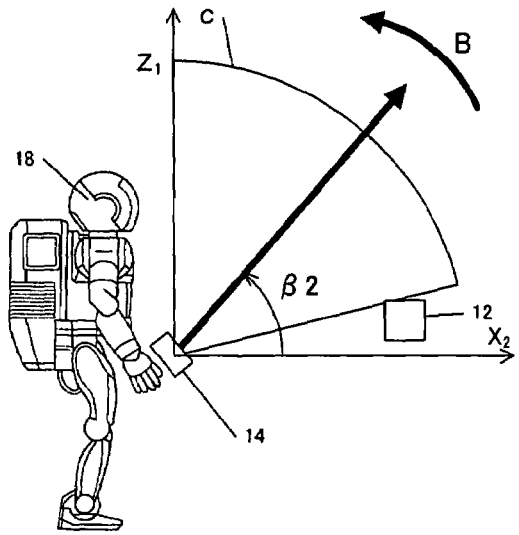
Figure 9:
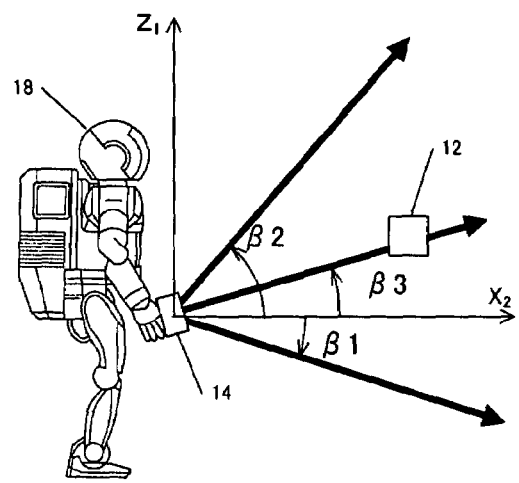

Now, the subroutine at step S109 will be described with reference to FIGS. 8 and 9. FIG. 8 is a flowchart of subroutine process for determining a vertical angle β3 of the RFID tag.

Until the horizontal angle of the robot 18 becomes α3, the robot 18 keeps turning according to the instruction given at step S313. When the horizontal angle of the robot 18 reaches α3 (S403), an instruction to stop turning in the horizontal direction is given to the robot 18 (S405).

The horizontal direction of RFID antenna 14 is the direction of the robot 18 in this embodiment. As RFID antenna 14 faces the horizontal angle α3, RFID antenna 14 detects the tag ID of the RFID tag 12 (S407), the process proceeds to step S417. If the boundary value β1 of the vertical angle β is not written in a memory (S417), an instruction to change the vertical angle of RFID antenna 14 in a positive direction is given to the robot 18 (S419).

The instruction to change the vertical angle of RFID antenna 14 is maintained while the RFID antenna 14 detects the tag ID of RFID tag 12 by repeating S407, S417 and Return. During this process, the robot 18 drives joints of the arms 18d to change vertical angle of RFID antenna 14 in the direction shown by an arrow A in FIG. 9(a).

When RFID antenna 14 no longer detects the tag ID of the RFID tag 12 (S407), an instruction to stop is issued to the robot 18 and whether or not a boundary value β1 of the vertical angle β has been written in the memory 37 is checked (S409). If β1 has not been written in the memory 37, the current vertical angle β is written in the memory 37 as the boundary value β1 (S421). FIG. 9(a) illustrates the detecting area C of the RFID antenna 14 carried by the robot 18 relative to RFID tag 12. In FIG. 9(a), vertical direction of RFID antenna 14 vertical angle β1 from the axis X2. An instruction to change the vertical direction of RFID antenna 14 to the negative direction, the opposite direction, is given to the robot 18 (S423).

The operational instruction is maintained while RFID antenna 14 detects the tag ID of RFID tag 12 by repeating steps S407, S417 and Return. During this process, the robot 18 droves joints of the arms 18d to change the direction of RFID antenna 14 to the direction shown by an arrow B in FIG. 9(b).

The operational instruction given to the robot 18 at step S419 and step S423 may be opposite to each other, an instruction to the negative direction may be given at step S419 and an instruction to the positive direction may be given at step S423.

When the RFID antenna 14 no longer detects the tag ID of the RFID tag 12 again (S407), a stop instruction is issued to the robot 18. Whether or not the boundary value β1 of the vertical angle β where the tag ID can be detected has been written in the memory 37 is checked (S409). If β1 has been written in the memory 37, the current vertical angel β is written in the memory 37 as another boundary value β2 (S411). FIG. 9(b) illustrates the detecting area C of the RFID antenna 14 carried by the robot 18 and its positional relation with RFID tag 12. In FIG. 9(b), RFID antenna 14 faces to the direction of the vertical angle β2.

With β1 and β2 read from the memory 37, the center value β3 of β1 and β2 is calculated (S413).

$$\beta 3 = (\beta 2 + \beta 1)/2 \quad (3)$$

The center value β3 is written into the memory 37, the angle β3 being the direction to RFID tag 12 (S413). An operational instruction to change the vertical direction of the RFID antenna 14 to the angle β3 is given to the robot 18 (S415). FIG. 9(c) illustrates relationship among the calculated vertical angles β3, β1 and β2.

After the vertical angle β3 is written in the memory 37, the subroutine returns to the main flow.

Figure 10:
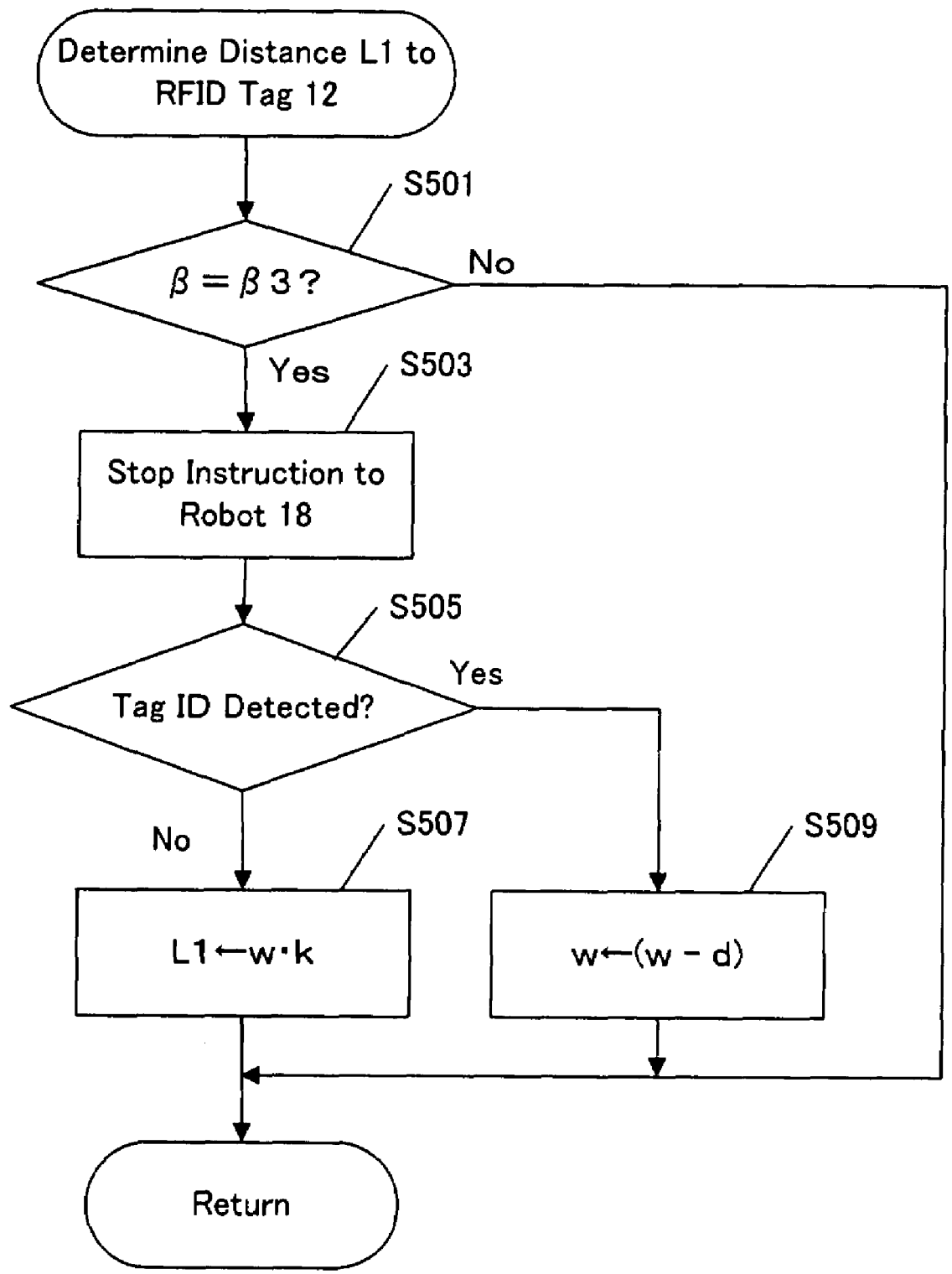
FIG. 10 is a flowchart of subroutine process for detecting a distance L1 between the RFID antenna and the RFID tag.

Now, the subroutine process at step S111 will be described with reference to FIG. 10. FIG. 10 is a flowchart of subroutine process for determining the distance L1 between the RFID antenna 14 and the RFID tag 12.

The robot 18 repeats this process according to the operational instruction given at S415 until the vertical angle of RFID antenna 14 reaches β3. When the vertical angle of RFID antenna 14 reaches β3 (S501), a stop instruction is given to the robot 18 (S503).

When the robot 18 stops moving, whether or not RFID antenna 14 detects the tag ID of the RFID tag 12 is checked (S505). If RFID antenna 14 detects the tag ID at this stage, the current output power w of RFID antenna 14 is reduced from the maximum value by d (S509).

This process (S509) of reducing the power of RFID antenna 14 is repeated until RFID antenna 14 fails to detect the tag ID of RFID tag 12, indicating that the power w is too weak to reach RFID tag 12.

When RFID antenna 14 no longer detects the tag ID of RHID tag 12 (S505), the power w is converted to distance L1 by multiplying a predetermined conversion coefficient k to the power w of RFID antenna 14. L1 is written into the memory 37 as the distance from RFID antenna 14 to RFID tag 12 (S507). The coefficient k has been determined beforehand based on the relationship between the output power of RFID antenna 14 and the distance the radio wave can reach RFID tag 12 for response.

With the method using the abovementioned FIGS. 3 to 10, the three-dimensional position of the RFID tag can be accurately and quickly estimated.

Although the present invention was described relative to specific embodiments, the present invention is not limited to the embodiments and may be changed without departing from the spirit of the present invention and used.

In the abovementioned embodiments, the direction from the RFID antenna 14 to the RFID tag 12 is determined as at steps S107 and S109 in FIG. 3, the distance L1 between the RFID tag 12 and the RFID antenna 14 is determined as at step S111, and the three-dimensional position of the RFID tag 12 is calculated. Alternatively, a method may be adopted such as, after the direction from the RFID antenna 14 to the RFID tag 12 is determined in the process up to step S109 in FIG. 3, the robot 18 may moved randomly or along a predetermined path, the process up to step S109 in FIG. 3 may be performed again at another position. A new directional vector may be calculated, and the cross-section with the directional vector calculated by the first process or the central point in the shortest distance may be made a three-dimensional position of the RFID tag 12.

Although the vertical angle β of the RFID antenna 14 is changed and the vertical angle β3 to the RFID tag 12 is calculated at step S109 in FIG. 3 in the abovementioned embodiments. Alternatively, a method may be adopted for rising or lowering the position of RFID antenna 14 and determining an upper limit height and an lower limit height at which a radio wave from the RFID tag can be detected. In this alternative method, the vertical angle β of the RFID antenna 14 may not be changed. A center position between the upper limit height and the lower limit height is determined as the height of the RFID tag 12. The process after step S111 may be performed at the position. In this case, after the RFID antenna 14 is moved to the center position, the three-dimensional coordinate of the RFID antenna 14 is written into the memory 37 as the position vector P1. The vertical angle β of the RFID antenna 14 may be written into the memory 37 as the vertical angle β3 to the RFID tag 12.

In the embodiments, the horizontal angle α of the RFID antenna 14 is similarly changed and the horizontal facing angle α3 to the RFID tag 12 is calculated at step S107 in FIG. 3. Alternatively, a method may be adopted for horizontally moving the RFID antenna 14 without changing the horizontal angle α of the RFID antenna 14. A range in which a radio wave from the RFID tag 12 can be detected may be determined. The process after step S109 may be performed at the center line in this range. In such a case, after the RFID antenna 14 is moved on the center line, the three-dimensional coordinate of the RFID antenna 14 is stored in the memory 37 as the position vector P1 and the horizontal angle α of the RFID antenna 14 is stored in the memory 37 as the horizontal angle α3 to the RFID tag 12.

Although a two-legged walking robot is described as a specific example of the robot 18 in the abovementioned embodiment, the robot 18 of the present invention is not limited to a two-legged walking robot. Alternatively, a device having other moving means such as a wheeled robot which can autonomously move may be used. Further, a crane carrying the RFID antenna 14 at one end may be used.

What is claimed is:

1. A method for determining a three-dimensional position of a Radio Frequency Identification (RFID) tag, comprising the steps of:
    moving, by a controller, a mobile object carrying an RFID antenna in a workplace to a first position where the RFID antenna receives a radio signal from said RFID tag;
    determining, by the controller, horizontal angle from the RFID antenna to the RFID tag based on the feasibility of communication between the RFID antenna and the RFID tag as the RFID antenna is turned or moved in a horizontal direction at the first position by the controller;
    determining, by the controller, a vertical angle from the RFID antenna to the RFID tag based on the feasibility of communication between the RFID antenna and the RFID tag as the RFID antenna is turned or moved in a vertical direction by the controller;
    determining, by the controller, a distance from the RFID antenna to the RFID tag based on the power of the signal received from the RFID tag; and
    determining, by the controller, a three-dimensional position of the RFID tag by vector calculation using the horizontal angle, the vertical angle, and the distance.

2. The method according to claim 1, wherein said mobile object is an autonomous legged robot or an autonomous wheeled robot.

3. A computer readable medium storing a computer program for determining a three-dimensional position of a Radio Frequency Identification (RFID) tag, said program when executed performs:
    moving a mobile object carrying an RFID antenna in a workplace to a first position where the RFID antenna receives a radio signal from said RFID tag;
    determining a horizontal angle from the RFID antenna to the RFID tag based on the feasibility of communication between the RFID antenna and the RFID tag as the RFID antenna is turned or moved in a horizontal direction at the first position by the controller;
    determining a vertical angle from the RFID antenna to the RFID tag based on the feasibility of communication between the RFID antenna and the RFID tag as the RFID antenna is turned or moved in a vertical direction by the controller;
    determining a distance from the RFID antenna to the RFID tag based on the power of the signal received from the RFID tag; and
    determining a three-dimensional position of the RFID tag by vector calculation using the horizontal angle, the vertical angle and the distance.

4. The medium according to claim 3, wherein said mobile object is an autonomous legged robot or an autonomous wheeled robot.

5. A system for estimating a three-dimensional position of a Radio Frequency Identification (RFID) tag in a workplace, comprising:
    a mobile object configured to move in the workplace;
    an RFID antenna carried by the mobile object for receiving a radio signal from the RFID tag;
    controlling means for moving said mobile object in the workplace to a position where said RFID antenna communicates with said RFID tag;
    means for causing said mobile object to move the RFID antenna in a horizontal direction to determine a horizontal angle from the RFID antenna to the RFID tag based on the feasibility of communication between the RFID antenna and the RFID tag as the RFID antenna is turned or moved;

means for causing said mobile object to move the RFID antenna in a vertical direction to determine a vertical angle from the RFID antenna to the RFID tag based on the feasibility of communication between the RFID antenna and the RFID tag as the RFID antenna is turned or moved;

means for determining a distance from the RFID antenna to the RFID tag based on the power of the signal received from the RFID tag; and means for determining a three-dimensional position of the RFID tag by vector calculation using the horizontal angle, the vertical angle and the distance.

* * * * *